(12) United States Patent
Nakayama et al.

(10) Patent No.: US 7,626,047 B2
(45) Date of Patent: Dec. 1, 2009

(54) METHOD OF PRODUCING FATTY ACID ALKYL ESTER FOR DIESEL FUEL OIL

(75) Inventors: Masahide Nakayama, Kyoto (JP); Keiichi Tsuto, Wakayama (JP)

(73) Assignee: REVO International Inc., Kyoto (JP)

( * ) Notice: Subject to any disclaimer, the term of this patent is extended or adjusted under 35 U.S.C. 154(b) by 802 days.

(21) Appl. No.: 10/504,093

(22) PCT Filed: Feb. 18, 2003

(86) PCT No.: PCT/JP03/01702

§ 371 (c)(1),
(2), (4) Date: Aug. 11, 2004

(87) PCT Pub. No.: WO03/070859

PCT Pub. Date: Aug. 28, 2003

(65) Prior Publication Data

US 2005/0081431 A1  Apr. 21, 2005

(30) Foreign Application Priority Data

Feb. 20, 2002 (JP) .............................. 2002-042627

(51) Int. Cl.
*C11B 3/10* (2006.01)
*C11C 1/08* (2006.01)
(52) U.S. Cl. ...................... 554/175; 554/191
(58) Field of Classification Search ................. 554/167, 554/168, 169, 175, 191
See application file for complete search history.

(56) References Cited

U.S. PATENT DOCUMENTS

| 4,303,590 | A | * | 12/1981 | Tanaka et al. | ................ 554/167 |
| 4,340,706 | A | * | 7/1982 | Obayashi et al. | ............ 526/207 |
| 5,128,251 | A | * | 7/1992 | Yokomichi et al. | .......... 435/134 |
| 5,399,731 | A | * | 3/1995 | Wimmer | ...................... 554/167 |

FOREIGN PATENT DOCUMENTS

| JP | 58-116689 | * | 7/1983 |
| JP | 58-187195 | | 11/1983 |

OTHER PUBLICATIONS

Freedman B. et al., Variables Affecting the Yields of Fatty Esters from Transesterified Vegetable Oils, 1984, JAOCS, vol. 61, No. 10, pp. 1638-1643.*
Supplementary European Search Report, for Application No. EP 03 70 5271, dated Nov. 29, 2005.

* cited by examiner

Primary Examiner—Porfirio Nazario-Gonzalez
Assistant Examiner—Yate' K Cutliff
(74) Attorney, Agent, or Firm—Antonelli, Terry, Stout & Kraus, LLP.

(57) ABSTRACT

A method for producing a fatty acid alkyl ester for diesel fuel oil starting with a fat/oil material such as an edible oil whereby the qualities required of diesel fuel oil can be satisfied and the wastes from the production process can be minimized. The method is characterized by including subjecting a fat/oil material to transesterification with an alcohol, washing with water the oily phase of the reaction mixture, eliminating water after washing via absorption by a high-water-absorptive resin, and then separating the high-water-absorptive resin gel to thereby provide a fatty acid alkyl ester suitable for diesel fuel oil.

17 Claims, No Drawings

METHOD OF PRODUCING FATTY ACID ALKYL ESTER FOR DIESEL FUEL OIL

TECHNICAL FIELD

The present invention relates to a method for producing a fatty acid alkyl ester for diesel fuel oil. More particularly, the invention relates to a method for producing a fatty acid alkyl ester suitable for use as a fuel for diesel automobiles or the like, the method including producing a fatty acid alkyl ester through transesterification of an alcohol, and a plant-derived fat/oil or a waste edible oil discharged by restaurants, food manufacturing factories, homes, etc. where the plant-derived fat/oil is consumed.

BACKGROUND ART

Generally, edible oil which has been consumed in and discharged by restaurants, food manufacturing factories, homes, etc. (i.e., waste edible oil) is treated in a manner of, for example, burying in soil a solidified oil formed through treatment with a solidification agent; or discharging as domestic waste and burning. However, in response to the growing consciousness of clean global environment, active attempts have been made to effectively re-use such a waste oil. In one ongoing attempt, a fatty acid methyl ester is produced through transesterification with methanol, and an oil suitable for diesel fuel is produced from the ester.

Specifically, a fatty acid methyl ester produced from a vegetable oil serving as an edible oil is similar to gas oil in terms of physical properties, such as viscosity and specific gravity, and combustion properties. Therefore, feasible use of the ester as bio-diesel fuel without the requirement to modify an engine has been already discussed. Recently, the fatty acid methyl ester has been of interest as a recyclable bio-related fuel, and wide-spread utilization thereof has been started in the United States and Europe. In Europe and America, however, a fatty acid methyl ester which has been produced from fresh vegetable oil is predominantly employed. Thus, since the production cost of the ester is higher than that of gas oil, the ester is usually employed as a mixture with gas oil.

In a fatty acid methyl ester which has been produced through transesterification of a fat/oil with methanol, glycerin (by-product), monoglyceride, diglyceride (reaction intermediates), and unreacted triglyceride remain even after completion of purification. When such residues remain in a large amount, the ester fails to satisfy quality requirement for a fuel oil. Thus, the amount of the residues is preferably reduced to as low a level as possible.

In other words, in a fatty acid methyl ester single system, hydrophilic glycerin which has been solubilized in the oily fatty acid methyl ester by the mediation of monoglyceride and diglyceride serving as amphiphilic substances may be separated from the oil and precipitate as a result of changes in external factors such as storage time and temperature. In a mixture system with gas oil, monoglyceride and diglyceride are dissolved also in the gas oil, thereby reducing the solubilization degree of glycerin in oil and increasing the possibility of separation and precipitation of glycerin. If such a phenomenon occurs during storage or in a fuel piping in an automobile, the ester systems cause some problems, failing to be employed as diesel fuel. Needless to say, the amount of methanol and water remaining in the fuel must be reduced to as low a level as possible.

Therefore, in Europe and America, quality standards of fatty acid methyl esters for use as diesel fuel oil have been determined. In accordance with the standards such as Germany (DINE 51606), France (Journal official), and Italy (UNI 10635), purity of fatty acid methyl ester is 98% or more, and monoglyceride content, diglyceride content, triglyceride (unreacted) content, and glycerin content are 0.8% or less, 0.2 to 0.4% or less, 0.2 to 0.4% or less, and 0.02 to 0.05% or less, respectively. At present, European (EU) universal standards are under consideration, and a most possible candidate purity of fatty acid methyl ester is 98% or more and glycerin content of 0.03% or less, and monoglyceride content, diglyceride content, and triglyceride content are considered to be 0.8% or less, 0.4% or less, and 0.4% or less, respectively, similar to the case of the Germany standards. As stipulated in ASTM PS-121-99 (US), glycerin content is 0.02% or less. In Japan, although no particular action has been taken for setting the standards for fatty acid methyl esters for use as a fuel, the standards will be discussed in the near future with reference to the European standards or other standards, so as to prevent problems in automobiles during driving.

When fatty acid methyl ester is purified under conditions satisfying, among the aforementioned quality standards in Europe and other countries, glycerin content of 0.03% or less (first condition) and purity of fatty acid methyl ester of 98% or higher (second condition), the purified ester has satisfactory qualities (e.g., viscosity and specific gravity) for use as diesel fuel oil and reduced monoglyceride content, diglyceride content, and triglyceride content. Even though these glycerides are present in very small amounts, they may conceivably solubilize methanol, water, or other oily impurities. Accordingly, the thus-obtained fatty acid methyl ester has substantially satisfactory qualities.

In view of the foregoing, demand exists for a method for purifying an alkyl ester for the purpose of enhancing its purity and reducing glycerin content.

A method for producing fatty acid alkyl ester from a fat/oil material has conventionally been known. In one exemplified method, a fat/oil (fatty acid triglyceride) is reacted with an alcohol in the presence of acid or an alkaline substance, to thereby form a fatty acid alkyl ester, followed by purifying and washing with water so as to remove acid, an alkaline substance, and other water-soluble substances. According to the method, a mixture liquid readily forms an emulsion through washing with water, and the emulsion must be left to stand for one day so as to remove added water.

Japanese Patent Application Laid-Open (kokai) No. 7-310090 discloses an improved purification method based on washing with water, in which washing water is added to a purified mixture and the resultant mixture is heated to 70 to 90° C., thereby avoiding emulsification and accelerating phase separation. However, in order to prevent hydrolysis of the formed fatty acid methyl ester caused by high-temperature treatment, the alkaline substance employed in reaction and dissolved in the fatty acid methyl ester must be neutralized with acid. In the method, washing effect is completely attained when 20 parts by weight or more of washing water is added to 100 parts by weight of the fatty acid methyl ester, and washing is performed twice. Although the method is envisaged to lower glycerin content, the purity may be lowered through hydrolysis caused by high-temperature treatment (i.e., although the alkaline substance is neutralized by an acid substance, correct neutralization is difficult, since the reaction system contains different phases; in fact, the high-temperature treatment is performed under alkaline or acidic condition). In addition, a large amount of wastewater must be treated.

Regarding facilities that produce waste edible oil, waste edible oil is collected by small amounts from a large number of facilities, and therefore, in consideration of transfer costs and other factors (e.g., 500 to 5,000 kg-fuel/day, usually 500 to 1,000 kg-fuel/day), such waste edible oil is reasonably treated in many small-scale facilities. Thus, installation of an additional wastewater treatment facility for carrying out washing treatment with water in each small-scale facility is very disadvantageous in terms of economy and space.

Japanese Patent Application Laid-Open (kokai) No. 10-245586 discloses in detail some purification methods that do not involve washing with water, the purification methods being included in a method for producing a diesel fuel oil from a waste edible oil. The disclosed purification methods includes a purification method employing adsorption of fatty acid alkyl ester by an adsorbent such as active terra alba. Through employment of the method, no wastewater is produced, and an alkaline component employed in the reaction can be removed via adsorption. However, glycerin, monoglyceride, diglyceride, and other substances are difficult to remove, and the purified fatty acid alkyl ester has insufficient quality for serving as a diesel fuel oil.

As described above, no conventional methods for purifying fatty acid alkyl ester for diesel fuel oil satisfy qualities required of diesel fuel oil and minimization of the amounts of wastes from the production process. Particularly, minimization of the amounts of wastes is a critical issue, when "zero-emission of waste" is to be attained, to a maximum degree, in a large number of small-scale facilities employing waste edible oil as a raw material.

DISCLOSURE OF THE INVENTION

In view of the foregoing, an object of the present invention is to provide a method for producing a fatty acid alkyl ester for diesel fuel oil employing as a starting material a fat/oil material such as an edible oil, particularly waste edible oil, whereby the qualities required of diesel fuel oil can be satisfied and the wastes from the production process can be minimized.

The present inventors have carried out extensive studies so as to attain the aforementioned object, and have found that a fatty acid alkyl ester having qualities sufficient for serving as diesel fuel oil can be produced through a simple, small-scale process in which, in the course of collection of a fatty acid alkyl ester through purification based on washing with water a fatty acid alkyl ester reaction mixture obtained through transesterification of a fat/oil material such as an edible oil, the amount of water for washing can be remarkably reduced through employment of washing an emulsion-state mixture with water and use of high-water-absorptive resin, whereby the amount of wastes such as wash liquid can be minimized. The present invention has been accomplished on the basis of this finding.

Accordingly, the present invention is directed to a method for producing a fatty acid alkyl ester for diesel fuel, including transesterification of fat/oil and alcohol, removing excessive alcohol after completion of the transesterification, separating a heavy liquid predominantly containing glycerin, to thereby produce a light liquid predominantly containing a fatty acid alkyl ester, and treatment of the light liquid, wherein the treatment of the light liquid comprises a first step of washing the light liquid with added water;

a second step of causing wash liquid to be absorbed by high-water-absorptive resin; and a third step of removing the high-water-absorptive resin in the form of gel which has absorbed the wash liquid in the second step.

The third removal step is generally performed through filtration or centrifugal separation.

The aforementioned first and second steps may be carried out sequentially or simultaneously. The two steps may be carried out simultaneously with the aforementioned third step.

In the first step, water for washing is preferably used in an amount of 1 to 10 parts by weight based on 100 parts by weight of the light liquid. In the second step, the high-water-absorptive resin is preferably used in an amount of 1 to 20 parts by weight based on 100 parts by weight of the water for washing.

When a fatty acid methyl ester—most preferred as a fuel—is a target ester product, the following more specific production conditions are preferably employed. Namely, 100 parts by weight of a fat/oil material and 10 to 30 parts by weight of methyl alcohol are subjected to the aforementioned transesterification in the presence of 0.2 to 1.5 parts by weight of added potassium hydroxide serving as a catalyst, and the reaction is performed at 50 to 100° C. Subsequently, a light liquid obtained from the reaction mixture is further treated.

In the production of a fatty acid alkyl ester for diesel fuel through treatment of a light liquid obtained from a transesterification mixture produced from a fat/oil and an alcohol, a fatty acid alkyl ester of satisfactory quality can be produced through the method for treating a light liquid employed in the present invention, and the production process requires no waste water treatment. Particularly when a waste edible oil is employed as a raw material, no requirement of waste water treatment apparatus—a heavy apparatus—is a great advantage for a large number of small-scale facilities.

THE MOST PREFERRED EMBODIMENT TO CARRY OUT THE INVENTION

Embodiments for carrying out the preset invention will next be described in detail.

<Transesterification>

In the production of a fatty acid alkyl ester for diesel fuel according to the present invention, examples of the fat/oil serving as a starting material of transesterification between the fat/oil and an alcohol includes rapeseed oil, sesame oil, soybean oil, corn oil, sunflower oil, palm oil, palm kernel oil, coconut oil, safflower oil, and mixtures of two or more species thereof.

In other words, the fat/oil is a mixture of fatty acid triglycerides containing an unsaturated or saturated aliphatic alkyl group having about 8 to 22 carbon atoms. Preferably, a fat/oil serving as a raw material for producing a fatty acid alkyl ester for diesel oil predominantly contains fatty acid triglycerides which form a fatty acid alkyl ester in the form of liquid and which has an unsaturated or saturated aliphatic alkyl group having about 10 to 18 carbon atoms. Particularly preferred fat/oils contain predominantly fatty acid triglycerides containing an unsaturated or saturated aliphatic alkyl group having about 12 to 18 carbon atoms.

Therefore, rapeseed oil, sesame oil, soybean oil, corn oil, palm oil, and mixtures of two or more species thereof are particularly preferably employed.

No particular limitation is imposed on the types of these fat/oil materials, and fresh (not used) edible oil and waste edible oil may be employed. In the present invention, use of a waste edible oil as a raw material is particularly advantageous, from the viewpoint of economy and social demand.

Waste edible oils have a variety of compositions and properties, depending on their origins. Generally, differing from fresh edible oil, waste edible oil is considered to contain solid foreign impurities, fat/oil degradation (e.g., by deterioration or polymerization) products, or other foreign substances.

However, a predominant portion of a waste edible oil remains unchanged, and if required, the foreign impurities may be removed through an appropriate preliminary treatment such as filtration so as to eliminate the effects of the impurities. Thus, the method for producing a fatty acid alkyl ester for diesel fuel is applied without any obstacles.

Examples of the alcohol to be reacted with the fat/oil include C1-C3 alkyl alcohols such as methyl alcohol (methanol), ethyl alcohol, and isopropyl alcohol, and mixtures of two or more species thereof. No particular limitation is imposed on the purity of the alcohol, but a low water content is preferred. Among C1-C3 alkyl alcohols, methyl alcohol and ethyl alcohol are more preferred as diesel fuel oil.

No particular limitation is imposed on the reaction method and reaction conditions for the transesterification between fat/oil and alcohol carried out in the present invention, and any routine methods; e.g., reaction in the presence of an acid or a base as a catalyst, reaction in the presence of a solid catalyst (chemical catalyst, bio-catalyst, etc.), and reaction in the absence or in the presence of a microamount of catalyst under high-temperature/pressure conditions (e.g., subcritical or supercritical state of alcohol) may be employed. Reactions conditions generally employed in the reaction methods may be employed.

Taking methanol, which is most suitable alcohol, as an example, the alcohol to be reacted with a fat/oil material is preferably employed in an amount of 10 to 30 parts by weight, more preferably 15 to 25 parts by weight, based on 100 parts by weight of the fat/oil, from the viewpoint of enhancement of reactivity. Taking into consideration that transesterification is an equilibrium reaction, the amount of alcohol is preferably large. However, an amount in excess of 30 parts by weight does not enhance reactivity commensurate with increase in amount. When an alcohol other than methanol is employed, the aforementioned proportion by weight is reduced to the corresponding equivalent proportion.

Examples of the alkali catalyst employed in transesterification include alkali substances such as sodium hydroxide, sodium carbonate, potassium hydroxide, potassium carbonate, sodium alcoholates, and potassium alcoholates. Of these, sodium hydroxide, potassium hydroxide, and similar compounds are preferred, with potassium hydroxide being most preferably employed in the present invention by virtue of the strongest alkalinity and catalytic action.

Potassium hydroxide is preferably employed in an amount of 0.2 to 1.5 parts by weight, more preferably 0.4 to 1.5 parts by weight, based on 100 parts of the fat/oil material. The reason for employment of such a large amount of catalyst is that reactivity of transesterification is required to be elevated to as high a level as possible in order to attain a 98% or more of the purity (see the European standards) of the fatty acid methyl ester serving as a fatty acid alkyl ester for diesel fuel, if purification of the fatty acid methyl ester through distillation (requiring a large amount of energy) is not taken into account. However, an amount of potassium hydroxide of 1.5 parts by weight or more is not advantageous from the viewpoint of high cost with respect to the effect thereof.

Furthermore, through employment of a strongly active catalyst such as potassium hydroxide, the efficiency of transesterification can be elevated, and unreacted triglyceride and diglyceride and monoglyceride (reaction intermediates) can be decreased. Thus, the amount of glycerin which is solubilized in the light liquid by diglyceride or monoglyceride is reduced, whereby a load in the light liquid treatment is mitigated and the amount of water for washing is reduced, thereby decreasing wastes.

The reaction temperature is not a key factor for enhancement of reactivity, and is preferably 50 to 100° C. from the viewpoint of rate of reaction. Within the range, a higher temperature is more effective. When the temperature in higher than 100° C. and potassium hydroxide is employed, glycerin by-produced under strong alkaline conditions may polymerize, or a fat/oil component may undergo decomposition reaction.

<Light Liquid Treatment Step>

The present invention, including transesterification of fat/oil and alcohol, removing excessive alcohol after completion of the transesterification, separating a heavy liquid predominantly containing glycerin, to thereby produce a light liquid predominantly containing a fatty acid alkyl ester, and treatment of the light liquid, is characterized in that the treatment of the light liquid comprises a first step of washing the light liquid with added water;

a second step of causing wash liquid to be absorbed by high-water-absorptive resin; and a third step of removing the high-water-absorptive resin in the form of gel which has absorbed the wash liquid in the second step, to thereby produce a fatty acid alkyl ester suitable for use as diesel fuel oil. The first to third steps, included in the light liquid treatment step, will next be described sequentially.

The main purpose of the water-washing step—the first step of the light liquid treatment step—is to remove a microamount of glycerin, alkaline substance, and like substances contained in the light liquid. Another purpose of the water-washing step is to remove a portion of other components; e.g., amphiphilic substances such as diglyceride and monoglyceride, through partition-dissolution in water for washing or similar means.

In an ideal state, the solubility of glycerin in a pure fatty acid alkyl ester is negligible. In the case of the corresponding methyl ester, the solubility thereof is about 0.01%, which is lower than a glycerin content of 0.03% as stipulated in the European standards. However, the fatty acid alkyl ester obtained through transesterification contains glycerin solubilized by amphiphilic substances such as monoglyceride and diglyceride, which are reaction intermediates. Thus, even though the reactivity is about 98%, the fatty acid alkyl ester contains about 0.07 to 0.09% glycerin.

If water-washing is performed in order to remove a microamount of glycerin and a comparative amount of dissolved alkaline substance, a large amount of water for washing should not be required. However, because of the presence of monoglyceride and diglyceride, which are amphiphilic substances, addition of a small amount of water to the ester and stirring the mixture results in formation of an emulsion. Particularly when this operation is performed under low-temperature conditions so as to prevent hydrolysis of the ester, separation of the aqueous phase from the emulsion becomes considerably difficult. In order to prevent formation of such an emulsion in a conventional method of washing with water, a large amount of water must be used. Washing with water may be performed under such mild stirring conditions that the mixture assumes almost two separated layers without forming an emulsion. However, water-washing efficiency is considerably low due to washing employing a small interface area.

As mentioned above, the conventional methods of washing with water must employ a large amount of water so as to prevent emulsification and attain satisfactory washing effect, thereby facilitating separation of water after washing. In contrast, the present invention intentionally employs effect of washing in an emulsion state, and washing is performed under vigorous stirring conditions. Even though the system becomes an emulsion, the emulsion is de-emulsified in the second step through water-absorption effect of high-water-absorptive resin, and water used in washing is removed through absorption by high-water-absorptive resin.

As used herein, the term "vigorous stirring" refers to stirring at least with such high intensity that the light liquid and water assume an apparently uniform state (emulsion) without causing separation to two layers, thereby attaining a sufficiently mixed state throughout the system. In contrast, when stirring is performed under weak stirring conditions, two layers remain separated from each other and the interface therebetween does not clearly appear.

According to the present invention, the light liquid is washed with water under enhanced contact conditions and under such vigorous stirring conditions. Therefore, excellent washing effect can be attained even by use of a small amount of water.

In this case, a microamount of dissolved alkaline substance is also removed. In order to prevent hydrolysis of a fatty acid alkyl ester in the above step, the washing step (the first step) is preferably performed at 50° C. or lower.

The amount of water for washing the light liquid is 1 to 10 parts by weight, preferably 1 to 5 parts by weight, based on 100 parts of the light liquid. When the amount of water is 1 part by weight or lower, washing efficiency is lowered.

The second step of the light liquid treatment step is the water-absorption treatment step, in which a high-water-absorptive resin powder is added to the light liquid, and the system is stirred so as to cause washing water to be absorbed by the high-water-absorptive resin. A portion of monoglyceride and diglyceride, which are amphiphilic substances, is also removed through adsorption on or dissolution in the surface of water that has been absorbed by the high-water-absorptive resin. Therefore, a high-water-absorptive resin powder having a large surface area is preferably used.

Through vigorous stirring so as to attain a satisfactory mixed state of the light liquid dispersion system, de-emulsification and absorption of washing with water are completed virtually instantaneously.

The high-water-absorptive resin is added in an amount of 1 to 20 parts by weight, preferably 1 to 10 parts by weight, based on 100 parts by weight of water for washing. When the amount of the resin is 1 part by weight or less, the amount of washing water that is not absorbed by the resin and remains in the light liquid may increase.

No particular limitation is imposed on the type of the high-water-absorptive resin employed in the present invention, and any polymer is preferably employed, so long as the polymer is a water-swellable polymer having a cross-linked structure, predominantly containing an acrylate salt and/or starch, and exhibiting a water absorption performance about 400 times or higher with respect to pure water and about 50 times or higher with respect to salt-containing water, based on the self weight of the polymer. Specifically, high-water-absorptive resin used in paper diapers and sanitary goods and commercial high-water-absorptive resin products serving as moisture-retaining material for soil, mud-hardener, etc. may be employed in a wide range.

The third step of the light liquid treatment step is a water-absorbed gel filtration step, in which a swollen gel of high-water-absorptive resin which has been employed in absorption of washing water is removed through filtration. When the high-water-absorptive resin exhibits the aforementioned performance and is present in an amount of 1 to 2 parts by weight or more based on the amount of washing water, the swollen gel of the high-water-absorptive resin assumes the form of a large number of particles having a stable form, and can be separated from the light liquid through a simple separation operation such as filtration or centrifugation. The thus-removed high-water-absorptive resin gel can be readily disposed of through optionally drying, and treatment in a firing furnace or a similar apparatus.

In the aforementioned light liquid treatment step of the present invention, the first step (water-washing step) and the second step (water-absorption treatment step) may be performed sequentially or simultaneously. Specifically, the second step may be performed after completion of the first step, or water for washing and high-water-absorptive resin may be simultaneously added to the light liquid.

In the case of simultaneous treatment, a high-water-absorptive resin containing water or a combination of water and a high-water-absorptive resin powder is added to the light liquid and the mixture is stirred vigorously, so as to cause water-soluble substances contained in the light liquid to be absorbed by the hydrous high-water-absorptive resin. Thereafter, the third step (water-absorbed gel filtration step) is performed.

The simultaneous treatment is more advantageous than the sequential treatment, in that the treatment is simplified by performing the first and second steps in a single process.

Since, in the simultaneous treatment, the time of contact between washing water and the light liquid is short, or a large portion of the washing water is present in the high-water-absorptive resin gel, the efficiency of dissolution of water-soluble components contained in the light liquid is inferior to that in the case of the sequential treatment. However, if a load of purification is reduced through satisfactory enhancement of the transesterification efficiency, the above insufficient dissolution efficiency is acceptable. In this case, the third step may also be simultaneously performed by causing the light liquid to pass through a column filled with a high-water-absorptive resin containing water.

Notably, performing effective purification by only causing the light liquid to pass through a column requires a sufficient mixed state and a sufficient time of contact between the light liquid and the high-water-absorptive resin gel swollen by water. In one preferred means for satisfying both requirements, a tank for the light liquid and the column are linked to form a loop, in which the light liquid is circulated at a sufficient flow rate.

According to the method for treating light liquid employed in the present invention, a fatty acid methyl ester for diesel fuel having a purity of fatty acid alkyl ester of 98% or higher and a glycerin content of 0.03% or lower, which are key quality requirements for fuel, can be produced without installing a waste water treatment facility.

The present invention will next be described in detail by way of examples along with experimental results, which should not be construed as limiting the invention thereto.

EXAMPLE

Waste edible oil (1,000 g) and a solution (210 g) of potassium hydroxide (10 g) in methanol were fed into a stirring bath, and the mixture was allowed to react at 65° C. for 30 minutes. After completion of reaction, methanol was collected through evaporation. The thus-obtained reaction mixture was subjected to phase separation, to thereby obtain 970 g of light liquid and 150 g of heavy liquid. Water (5 parts by weight) was added to the light liquid (100 parts by weight), and the mixture was maintained under vigorous stirring (stirring for uniformly mixing) to form emulsion for 5 minutes for 40° C. (in order to prevent hydrolysis of fatty acid methyl ester), to thereby wash the light liquid with water. Subsequently, high-water-absorptive resin (Aqua Keep 10SH, product of Sumitomo Seika Chemicals, Co., Ltd.) (10 parts by weight, based on 100 parts by weight of washing water) in the form of powder was dispersed in the washed mixture, and the mixture was maintained for 10 minutes under the same conditions as employed in washing with water, followed by heating to 50° C. At this moment, free water was not observed. The thus-formed gel of the high-water-absorptive resin which contains water was removed through filtration by means of filter paper, to thereby collect a transparent, pale brown liquid. Finally, a subtle amount of water and methanol were evaporated out under reduced pressure at 80° C. The product was found to have a fatty acid methyl ester content and a glycerin content of 98.2% and 0.02% (both weight basis), respectively, as measured through gas chromatography.

Comparative Example 1

To the light liquid (100 parts by weight) produced through the same procedure as employed in the Example, washing water (20 parts by weight) was added. The mixture was maintained under weak stirring (such stirring that two separated layers were maintained and emulsification was prevented, with a slightly unclear interface) for 15 minutes for 40° C. Subsequently, the mixture was allowed to stand for 15 minutes, and the aqueous layer was removed. The above procedure was repeated, to thereby obtain two aliquots of wash liquid. The thus-obtained liquid was slightly opaque. The liquid was dehydrated in a manner similar to that of the Example, to thereby collect a transparent, pale brown liquid. The product was found to have a fatty acid methyl ester content and a glycerin content of 97.8% and 0.05% (both weight basis), respectively, as measured through gas chromatography.

Comparative Example 2

To the light liquid (100 parts by weight) produced through the same procedure as employed in the Example, active terra alba (1 part by weight) was added. The mixture was maintained under vigorous stirring (stirring for uniformly mixing) at room ambient temperature for 15 minutes. Subsequently, terra alba was removed through filtration, to thereby collect a transparent, pale brown liquid. The product was found to have a fatty acid methyl ester content and a glycerin content of 97.4% and 0.09% (both weight basis), respectively, as measured through gas chromatography.

The invention claimed is:

1. A method for producing a fatty acid alkyl ester for diesel fuel, including transesterification of fat/oil and alcohol, removing excessive alcohol through evaporation after completion of the transesterification, separating a heavy liquid predominantly containing glycerin, to thereby produce a light liquid predominantly containing a fatty acid alkyl ester, and treatment of the light liquid,
wherein the treatment of the light liquid comprises:
a first step of washing the light liquid with added water;
a second step of causing wash liquid from the first step to be absorbed by high-water-absorptive resin; and
a third step of removing the high-water-absorptive resin in the form of gel which has absorbed the wash liquid in the second step,
wherein in said first step of washing the light liquid with added water, the washing is performed under vigorous stirring and the light liquid and added water are in an emulsion without causing separation into two layers, and in the second step the emulsion is de-emulsified.

2. A method for producing a fatty acid alkyl ester for diesel fuel as described in claim 1, wherein removing of the third step is performed through separation by filtration or centrifugal separation.

3. A method for producing a fatty acid alkyl ester for diesel fuel as described in claim 1, wherein the first and second steps are carried out sequentially.

4. A method for producing a fatty acid alkyl ester for diesel fuel as described in claim 1, wherein the first and second steps or the first to third steps are carried out simultaneously.

5. A method for producing a fatty acid alkyl ester for diesel fuel as described in claim 1, wherein, in the first step, water for washing is used in an amount of 1 to 10 parts by weight based on 100 parts by weight of the light liquid.

6. A method for producing a fatty acid alkyl ester for diesel fuel as described in claim 1, wherein, in the second step, the high-water-absorptive resin is added in an amount of 1 to 20 parts by weight based on 100 parts by weight of the water for washing.

7. A method for producing a fatty acid alkyl ester for diesel fuel as described in claim 1, wherein, 100 parts by weight of a fat/oil material and 10 to 30 parts by weight of methyl alcohol are subjected to the transesterification in the presence of 0.2 to 1.5 parts by weight of added potassium hydroxide serving as a catalyst, the reaction is performed at 50 to 100° C., and a light liquid obtained from the reaction mixture is treated in said treatment.

8. A method for producing a fatty acid alkyl ester for diesel fuel as described in claim 2, wherein the first and second steps are carried out sequentially.

9. A method for producing a fatty acid alkyl ester for diesel fuel as described in claim 8, wherein, in the first step, water for washing is used in an amount of 1 to 10 parts by weight based on 100 parts by weight of the light liquid.

10. A method for producing a fatty acid alkyl ester for diesel fuel as described in claim 9, wherein, in the second step, the high-water-absorptive resin is added in an amount of 1 to 20 parts by weight based on 100 parts by weight of the water for washing.

11. A method for producing a fatty acid alkyl ester for diesel fuel as described in claim 10, wherein, 100 parts by weight of a fat/oil material and 10 to 30 parts by weight of methyl alcohol are subjected to the transesterification in the presence of 0.2 to 1.5 parts by weight of added potassium hydroxide serving as a catalyst, the reaction is performed at 50 to 100° C., and a light liquid obtained from the reaction mixture is treated in said treatment.

12. A method for producing a fatty acid alkyl ester for diesel fuel as described in claim 2, wherein the first and second steps or the first to third steps are carried out simultaneously.

13. A method for producing a fatty acid alkyl ester for diesel fuel as described in claim 12, wherein, in the first step, water for washing is used in an amount of 1 to 10 parts by weight based on 100 parts by weight of the light liquid.

14. A method for producing a fatty acid alkyl ester for diesel fuel as described in claim 13, wherein, in the second step, the high-water-absorptive resin is added in an amount of 1 to 20 parts by weight based on 100 parts by weight of the water for washing.

15. A method for producing a fatty acid alkyl ester for diesel fuel as described in claim 14, wherein, 100 parts by weight of a fat/oil material and 10 to 30 parts by weight of methyl alcohol are subjected to the transesterification in the presence of 0.2 to 1.5 parts by weight of added potassium hydroxide serving as a catalyst, the reaction is performed at 50 to 100° C., and a light liquid obtained from the reaction mixture is treated in said treatment.

16. A method for producing a fatty acid alkyl ester for diesel fuel as described in claim 1, wherein said first step of washing the light liquid with added water is performed at 50° C. or lower.

17. A method for producing a fatty acid alkyl ester for diesel fuel as described in claim 1, wherein said excessive alcohol is removed through evaporation prior to said treatment of said light liquid.

* * * * *